(12) United States Patent
Scheele et al.

(10) Patent No.: US 9,290,159 B1
(45) Date of Patent: Mar. 22, 2016

(54) AIR FOIL SYSTEMS AND METHODS

(71) Applicant: See II Corporation, Darby, MT (US)

(72) Inventors: Rick L. Scheele, Darby, MT (US); Dennis I. Nelson, Darby, MT (US)

(73) Assignee: SEE II CORPORATION, Darby, MT (US)

( * ) Notice: Subject to any disclaimer, the term of this patent is extended or adjusted under 35 U.S.C. 154(b) by 0 days.

(21) Appl. No.: 14/245,354

(22) Filed: Apr. 4, 2014

(51) Int. Cl.
*B62D 37/00* (2006.01)
*B60S 1/56* (2006.01)
*B62D 35/00* (2006.01)

(52) U.S. Cl.
CPC .. *B60S 1/56* (2013.01); *B62D 35/00* (2013.01)

(58) Field of Classification Search
CPC .................................. B60S 1/56; B62D 35/00
See application file for complete search history.

(56) References Cited

U.S. PATENT DOCUMENTS

| | | | | |
|---|---|---|---|---|
| 3,999,797 A | * | 12/1976 | Kirsch et al. | 296/180.4 |
| 4,320,920 A | * | 3/1982 | Goudey | 296/180.4 |
| 4,603,810 A | * | 8/1986 | Schleimer et al. | 239/1 |
| 4,674,788 A | * | 6/1987 | Ohmura et al. | 296/180.5 |
| 4,881,772 A | * | 11/1989 | Feinberg | 296/180.1 |

* cited by examiner

*Primary Examiner* — Lori L Lyjak
(74) *Attorney, Agent, or Firm* — Wells St. John P.S.

(57) ABSTRACT

An air foil system that can include a complimentary pair of inner and outer air foil elements forming an openings and exits in one cross section, the opening being from 2 and 6 inches in height in the one cross section and the exit being from between about ¾ and 4 inches in height in the one cross section. The complimentary inner and outer air foil elements may form a compression chamber between the complimentary entrance and exit edges, the compression chamber having a height in one cross section that is from ½ inch to about 3 inches. A mounting assembly may be operatively connected to the inner and outer air foil elements for aligning the opening within 5 inches of the rearmost portion of rear-facing portion and mounting the air foil elements to the rear-facing portion of the vehicle. Methods for reducing the co-efficiency of drag and clearing of a rear-facing portion of a vehicle is provided, the method comprising projecting a horizontal airstream passing over a roof of the portion as the vehicle is propelled over a roadway to provide two moving air curtains over the rear-facing portion, reducing the co-efficiency of drag of the portion, and clearing a portion of the rearward surface of the rear-facing portion.

20 Claims, 5 Drawing Sheets

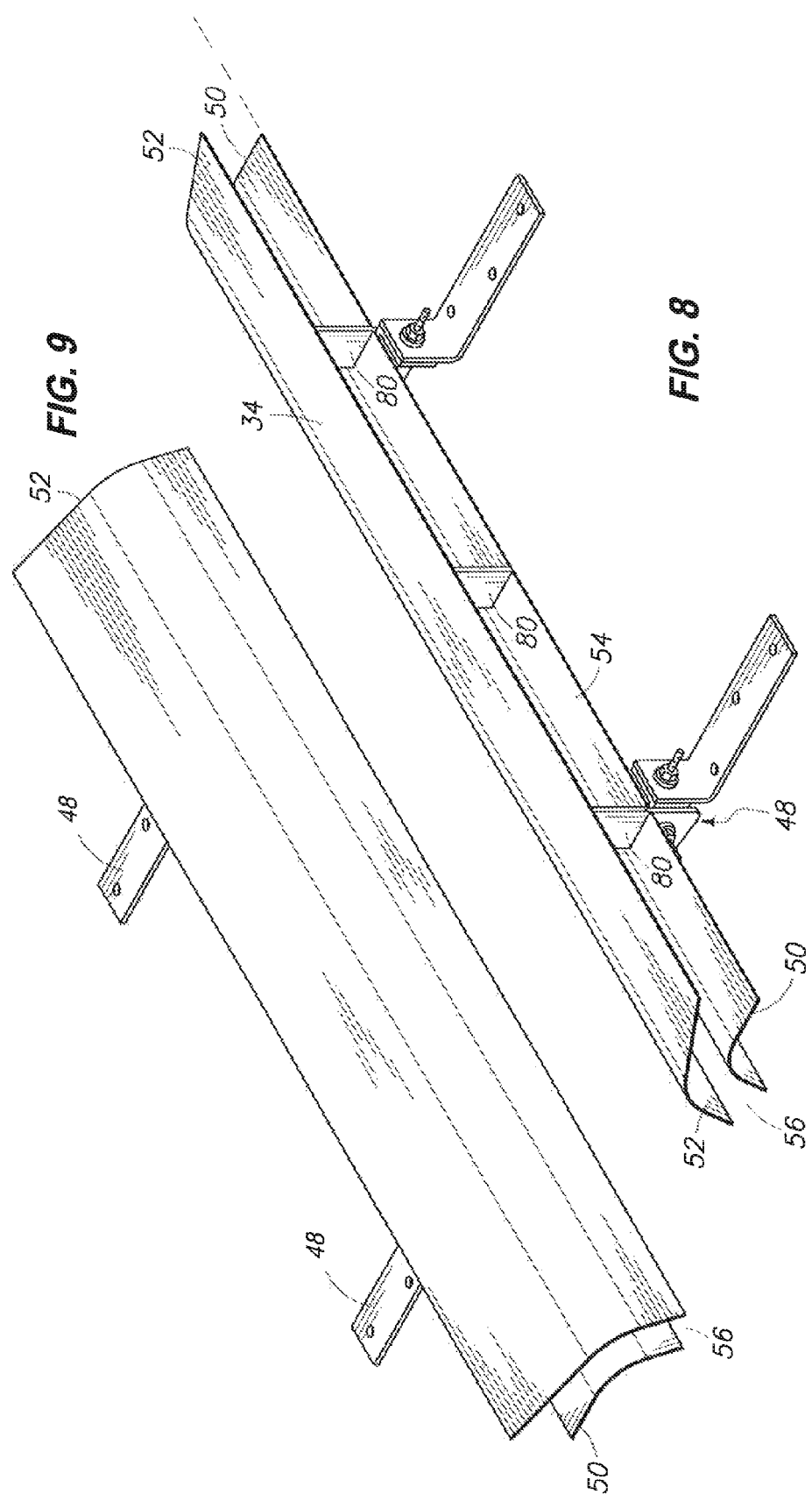

AIR FOIL SYSTEMS AND METHODS

CROSS REFERENCE TO RELATED APPLICATION

This application incorporates previously issued U.S. Pat. No. 5,199,762 issued Aug. 6, 1993, the entirety of which is incorporated by reference herein.

TECHNICAL FIELD

This present disclosure relates to air foil systems and methods. Particular embodiments of the disclosure can be utilized to remove debris from a rear facing portion of a vehicle, such as a side mirror or back portion of the vehicle. Example debris can include snow, ice, and/or road dirt. Particular methods of the disclosure can be used to reduce the co-efficiency of drag of the rear facing portion as well, increasing fuel efficiency of the vehicle to a surprising extent.

BACKGROUND

Rear facing portions of vehicles can collect, depending upon the weather and road conditions, debris such as undesirable particulate material including dirt, dust, grime, mud and snow on a rear panel of the vehicle. Many vehicles include these portions; buses, vans, semi-trailers, motor homes, travel trailers and a wide variety of trucks. But almost all land vehicles include rearview mirrors which are also a rear facing portion of the vehicle.

This debris collection problem is particularly serious and presents a safety hazard when the deposited undesirable particulate material hampers a driver from having clear vision through a window in the rear panel of the vehicle and/or seeing a clear reflection through a rear facing mirror of the vehicle. Additionally, it is not unusual for the debris to cover and obscure rear lights of the vehicle increasing the probability that the vehicle may not be seen and/or be involved in a rear end accident.

The present disclosure provides systems and methods that prevent accumulation of and/or remove debris from these rear facing portions as well as reduce drag co-efficiency upon the rear facing portion which can improve fuel economy.

SUMMARY OF THE DISCLOSURE

An air foil system for attachment to an upper rear edge of a rear-facing portion of a vehicle to project into a horizontal airstream passing over a roof of the portion as the vehicle is propelled over a roadway to deflect and direct two layers of the airstream over the upper rear edge and downward along the rear-facing portion to provide two moving air curtains over the rear-facing portion is provided, comprising a complimentary pair of inner and outer air foil elements aligned along the upper rear edge and configured to receive airstream from a front portion of the vehicle, the inner air foil element extending between an entrance edge and an exit edge, the elongated outer air foil element complementary to and extending between the entrance edge and the exit edge with the entrance edge of the outer air foil element being displaced above the entrance edge of the inner air foil element and the exit edge of the outer air foil element being displaced rearward of the exit edge of the inner air foil element. The complimentary inner and outer air foil elements may form an opening in one cross section between entrance edges and an exit between exit edges, the opening being from 2 and 6 inches in height in the one cross section and the exit being from between about ¾ and 4 inches in height in the one cross section. A mounting assembly is provided which may be operatively connected to the inner and outer air foil elements for attaching the air foil elements to the rear-facing portion of the vehicle.

The complimentary inner and outer air foil elements may form a compression chamber between the complimentary entrance and exit edges, the compression chamber having a height in one cross section that is from ½ inch to about 3 inches.

A mounting assembly may be operatively connected to the inner and outer air foil elements for aligning the opening within 5 inches of the rearmost portion of rear-facing portion and mounting the air foil elements to the rear-facing portion of the vehicle.

A method for reducing the co-efficiency of drag and clearing of a rear-facing portion of a vehicle is provided, the method comprising projecting a horizontal airstream passing over a roof of the portion as the vehicle is propelled over a roadway to provide two moving air curtains over the rear-facing portion, reducing the co-efficiency of drag of the portion, and clearing a portion of the rearward surface of the rear-facing portion.

DRAWINGS

Embodiments of the disclosure are described below with reference to the following accompanying drawings.

FIGS. 8 and 9 are perspective views of an air foil system according to an embodiment of the disclosure.

DESCRIPTION

This disclosure is submitted in furtherance of the constitutional purposes of the U.S. Patent Laws "to promote the progress of science and useful arts" (Article 1, Section 8).

Figure 1:
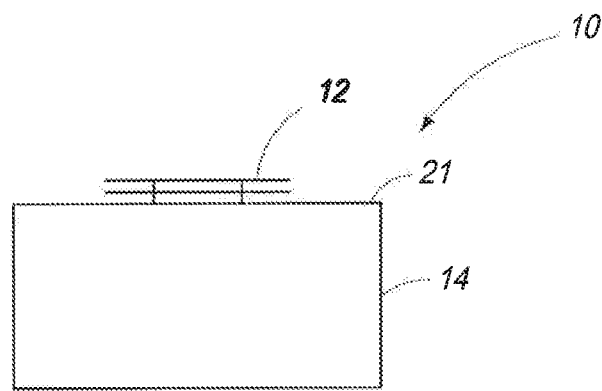
FIG. 1 is an air foil system according to an embodiment of the disclosure.

Air foil systems and methods are described with reference to FIGS. 1-9. Referring first to FIG. 1, an air foil system 10 is shown that includes an air foil assembly 12 coupled to a rear-facing portion 14 of a vehicle. Also included in FIG. 1 is an upper edge 21 of the rear-facing portion 14 of a vehicle. Rear-facing portion 14 of the vehicle can be a square-backed portion of a cargo van, for example. Portion 14 can also be a rear-view mirror, such as left and/or right rear-view mirrors of the vehicle. In accordance with example implementations, rear-facing portion 14 of the vehicle can be substantially large diesel tractor rear-view mirrors and/or substantially large rear-facing portions of diesel tractor cabs. Example implementations of assembly 12 can include attaching assembly 12 to upper edge 21 of the rear-facing portion of the vehicle.

Figure 2:
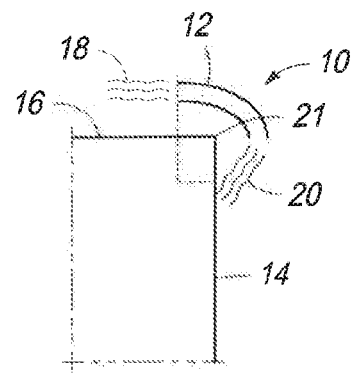
FIG. 2 is an air foil system according to an embodiment of the disclosure.

Referring next to FIG. 2, assembly 10 is shown that includes air foil assembly 12 situated above rear-facing portion 14 of a vehicle having a roof section 16 associated therewith. In accordance with an example implementation, air flow 18 can pass over roof section 16 and be passed through air foil assembly 12 down an exit 20 and be directed towards and/or down across rear-facing portion 14. This air flow can be provided from a forward portion of the vehicle as the vehicle is propelled over a roadway, for example. This air flow can be directed as at least two layers of air stream over edge 21 and downward along rear-facing portion 14 to provide two moving air curtains over rear-facing portion 14.

Figure 3:
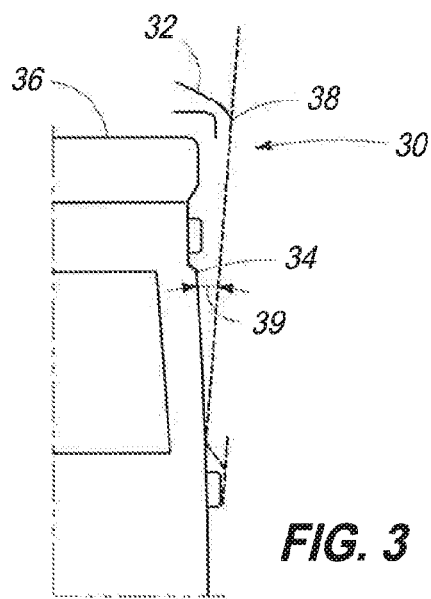
FIG. 3 is an air foil system according to an embodiment of the disclosure.

Referring next to FIG. 3, in accordance with another example embodiment, assembly 30 can be associated in more particular embodiments with the rear-facing portion 34 of a vehicle such as a cargo van or transport van or bus. Rear-facing portion 34 can be associated with a roof portion 36 and air foil assembly 32 can be provided therewith as well. As can be seen, an upper foil of the air foil assembly 32 can have a rearmost facing edge 38 that may be established at an angle 39 relative to the rear-facing portion 34. This angle can be acute rather than parallel to the surface established by portion 34. Accordingly, this acute angle 39 may lead to the direction of air toward impact with rear-facing portion 34.

Figure 4:
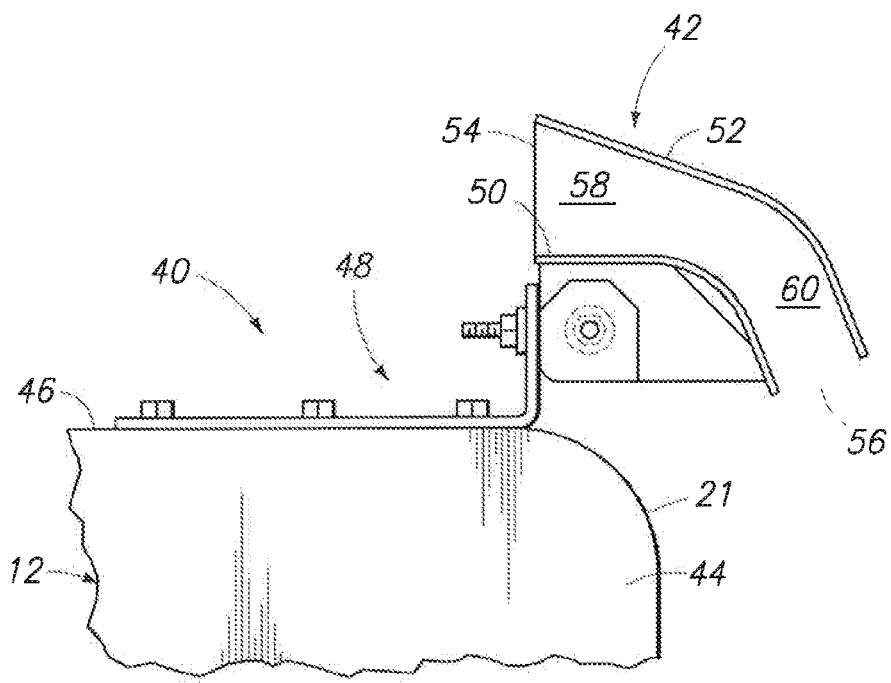
FIG. 4 is a more detailed view of an air foil system according to an embodiment of the disclosure.

Referring next to FIG. 4, and in accordance with another example implementation, assembly 40 can include a rear-facing portion 44 and associated with a roof portion 46 as well as an edge portion 21. Assembly 40 can include an air foil assembly 42 as well as a bracket assembly 48 that may be utilized to removably couple or fixedly attach air foil assembly 42 to a vehicle that is comprised by rear-facing portion 44 and roof portion 46. As can be seen in FIG. 4, assembly 42 can include an upper foil 52 associated with a lower foil 50. Together, these foils can form an opening 54 and an exit 56. Within that opening can be an opening area of the foil 58 and an exit area of the foil 60.

This association of foils can be considered a complementary pair of inner and outer foil elements aligned along the upper rear edge and configured to receive air stream from a front portion of the vehicle, with the inner foil element extending between an entrance edge, such as the edge established by entrance 54, and an exit edge, such as the edge established by exit 56. The elongated outer air foil element such as element 52 can be complimentary to and extend between the entrance edge and the exit edge, with the entrance edge of this outer foil element being displaced above the entrance edge of the inner foil element, such as element 50. The system can include an exit edge of the outer foil element being placed rearward of the exit edge of the inner foil element as shown in FIG. 4.

In accordance with example implementations provided herein, these foil elements can have a continuous surface uninterrupted by corners and/or edges, for example, a smooth surface and/or curved surface, without the addition of sharp edges or points that may be included to establish corners. The inner and outer foil elements can provide for a smooth transition between a front edge and a bottom edge, or one edge to another edge via this curved structure.

Figure 5:
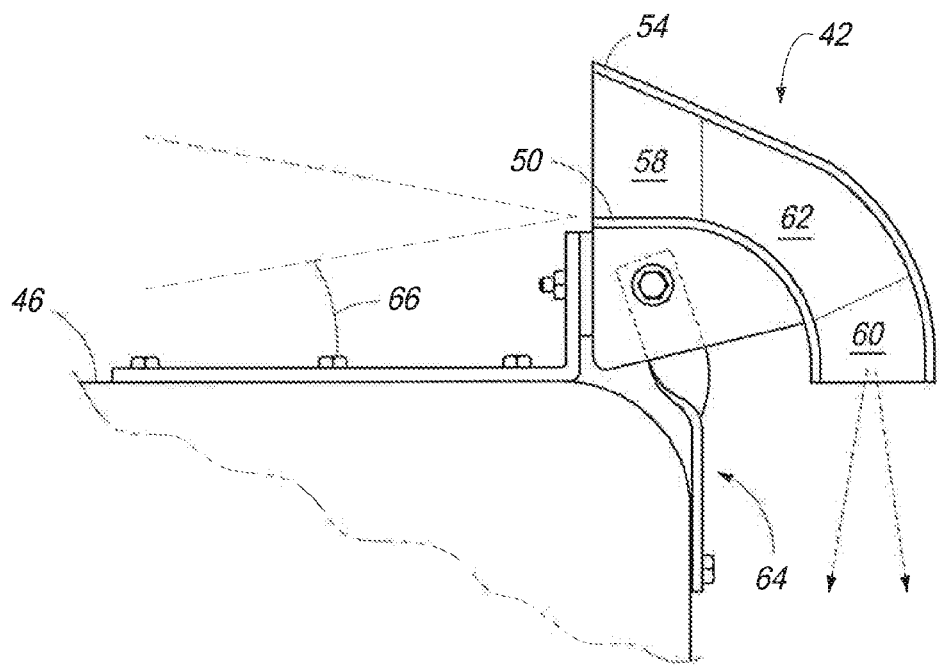
FIG. 5 is an even more detailed view of an air foil system according to an embodiment of the disclosure.

Referring next to FIG. 5, association of air foil assembly 42 with a vehicle having a rear-facing portion and roof 46 is shown that includes an additional bracket support 64 that can be utilized to further support air foil 42 in relation to roof portion 46. Support 64 can extend from the rear-facing portion to assembly 42 and/or another bracket that may support assembly 42 from the roof portion.

Further, the relation between inner foil 50, particularly, the forward most edge of inner foil 50, is shown in relation to the plane established by roof portion 46. As can be seen, the inner surface of the innermost foil 50 can establish a plane that, when associated with the plane of roof 46, establishes an acute angle thereto, wherein the angle is other than parallel and the direction of the acute angle 66 is one that is less than 90°.

FIG. 5 also provides the area of compression chamber 62 of the air foil assembly 42. As can be seen, this compression chamber can have a height or distance between the inner foil 50 and outer foil 52 that is from ½ inch to about 3 inches. In accordance with other example implementations, the height can be from about 1½ inches to about 3 inches, and/or ½ inch to about 1½ inches. This compression chamber can provide the focusing of air flow that provides for the lowering of drag of the rear portion and/or as well as the removal of debris for the rear-facing portion 44.

Figure 6:
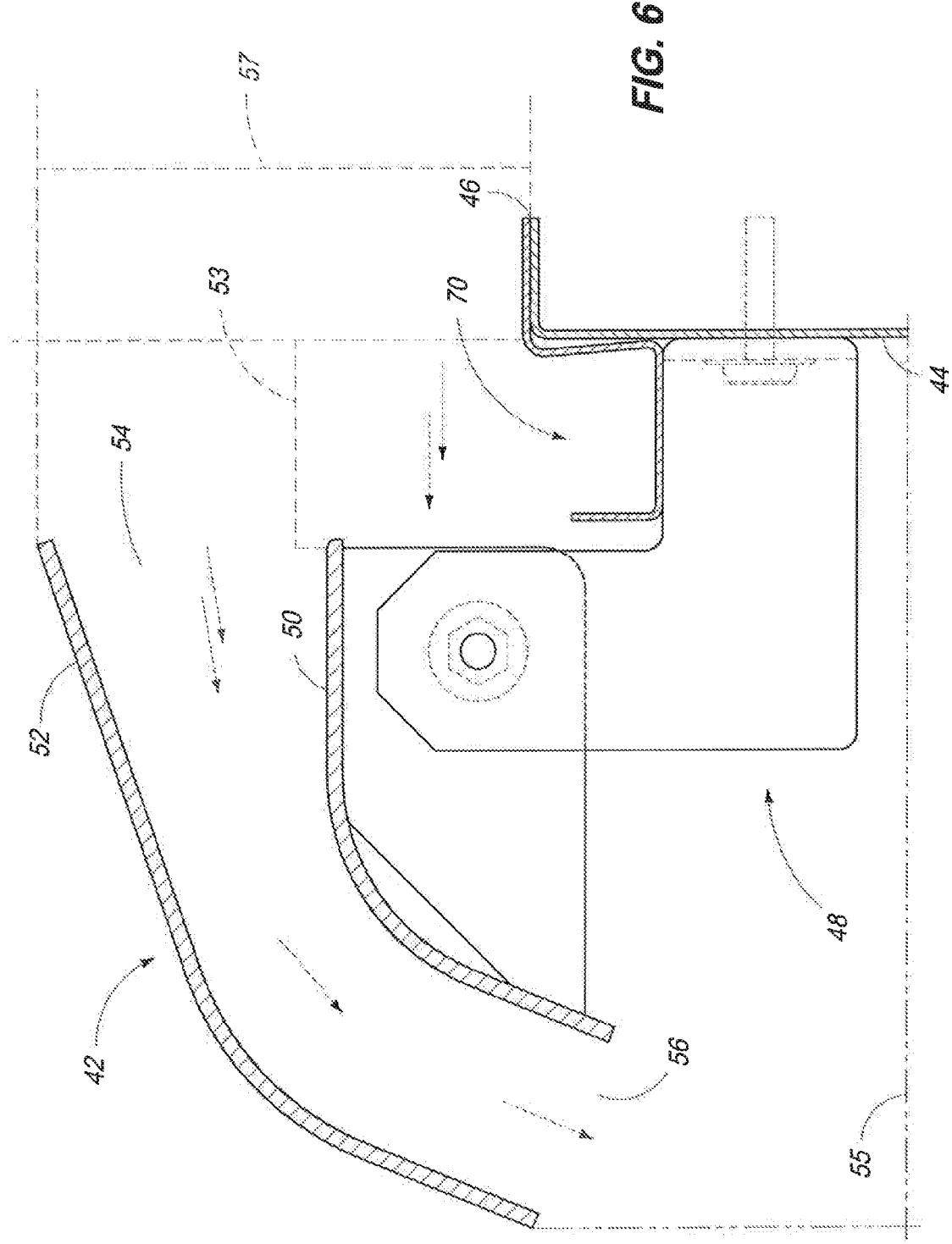
FIG. 6 is a detailed view of an air foil system according to an embodiment of the disclosure.

Referring next to FIG. 6, an implementation of air foil assembly 42 is shown in relation to a rearmost facing portion of a vehicle 44 in association with roof portion 46. As can be seen, a forward most edge of either or both of inner or outer foils 50 and 52 can be positioned in relation to the edge established between roof portion 46 and rear-facing portion 44. This distance can be within about 5 inches of a rear-facing portion 44 in accordance with an example implementation and shown as the distance 53. As shown in FIG. 6, the positioning of air foil 42 can be within 8 inches, as represented by the distance 57 to roof portion 46. In accordance with example implementations, this distance can be within 6 to 8 inches and/or to within 5 to 8 inches as well.

In accordance with other example configurations, the distance 55 between the rearward most portion of air foil assembly 42 and the rear-facing portion of the vehicle 44 can be 3 inches to 5½ inches. The rearmost portion of foil assembly 42 can direct air to within air stream from the exit 56 to greater than ¾ inch below the rear edge along the rear-facing portion of vehicle 44.

Figure 7:
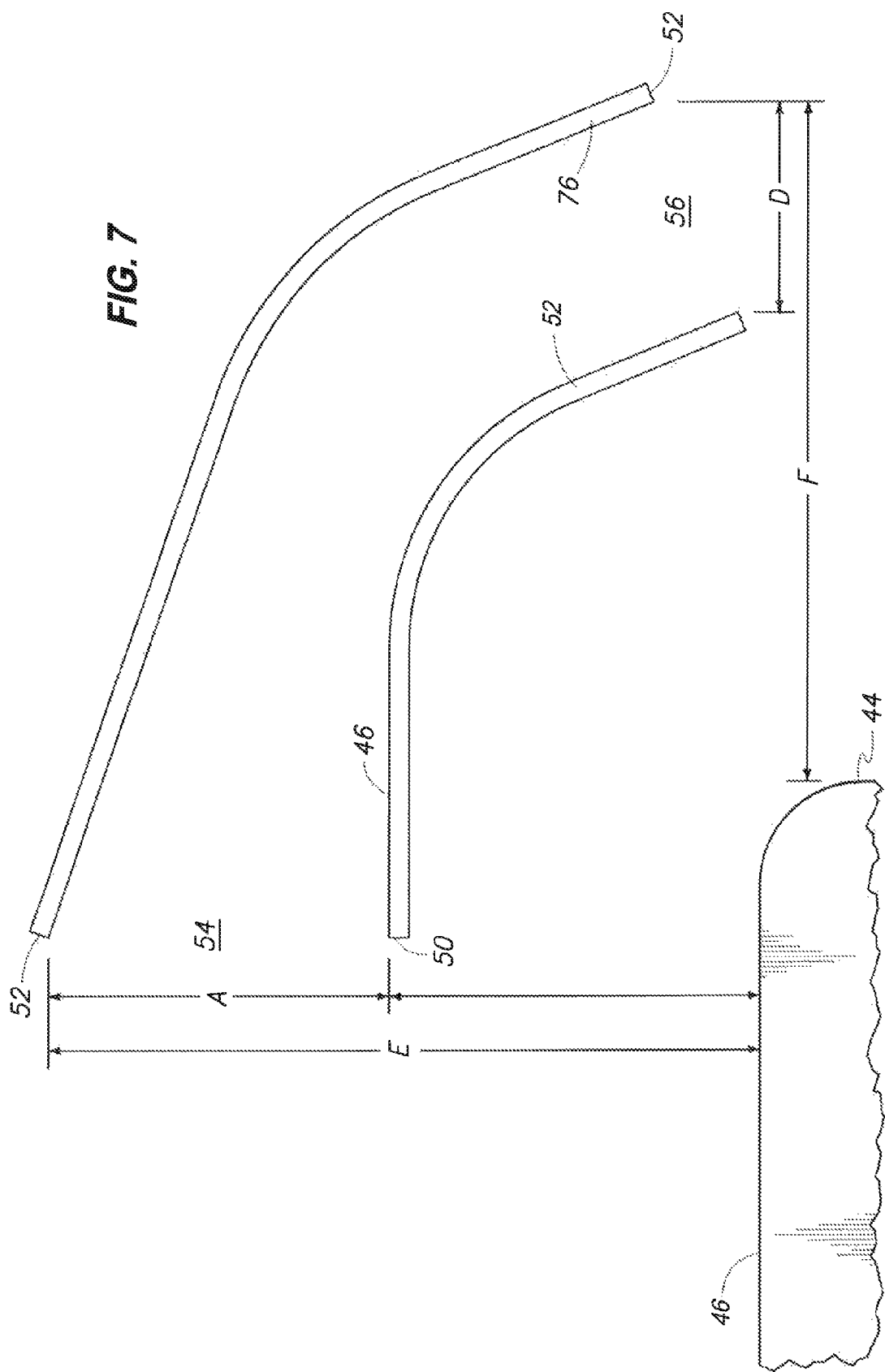
FIG. 7 is an air foil system according to an embodiment of the disclosure.

Referring to FIG. 7, an example association of air foil assembly 42 in relation to vehicle portions 44 and 46 is shown. As can be seen, there are definite dimensions for openings 56 and 54 represented as D and A, respectively, as well as relationship dimensions E and F, respectively. In accordance with example configurations, opening A for air foil opening 54 can be from 2 to 6 inches in height in one cross-section and/or 3 to 6 inches in height in one cross-section, and/or 2 to 3 inches in height in one cross-section.

In accordance with example implementations, that exit 56 represented as dimension D can be from about ¾ inch to 4 inches in height in one cross-section, from 2 to 4 inches in height in one cross-section, and/or from ¾ to 2 inches in height in one cross-section.

In accordance with example implementations, these openings and exits can be associated as follows: In one assembly, the opening can be from 2 to 6 inches in height in one cross-section and the exit can be from ¾ to 4 inches in height in one cross-section. In another assembly, the opening can be from 3 to 6 inches in height in one cross-section, and the exit can be from 2 to 4 inches in height in one cross-section. In still another assembly, the opening can be from 2 to 3 inches in height in one cross-section, and the exit can be from ¾ to 2 inches in height in one cross-section.

Referring next to FIGS. 8 and 9, perspective views of an assembly 42 are shown that include the air foil elements described, as well as supports 80 coupling the air foil elements together and supporting same. This perspective view provides a width of the association of the air foil elements that in the context of the view of FIG. 1 can be established in relation to a rear view of the rearward rear-facing portion of the vehicle. In accordance with example implementations, the air foil elements can extend along the edge distance from about 10 inches to about 96 inches, or from about 10 inches to 60 inches, or from about 10 inches to 80 inches, or from about 60 inches to 80 inches, or from about 60 inches to 90 inches, and in some certain situations, inner and outer air foil elements as described can extend along the edge a distance of at least a third of the maximum distance of the edge that is represented in FIG. 1, for example. According to embodiments of the disclosure, a mounting assembly 48 can be provided that operably connects the inner and outer air foil elements with the edge of the vehicle portion for which it is being utilized.

In all of these assemblies, a mounting assembly 48 can be provided that operably connects the inner and outer air foil elements with the edge of the vehicle portion for which it is being utilized. In accordance with example implementations, these air foil elements in association with these particular vehicles can be used to project a horizontal air stream passing over the roof of the portion of the vehicle, as the vehicle is propelled over the roadway, to provide two moving air curtains over the rear-facing portion. This method can also include reducing the co-efficiency via drag along the portion which substantially increases fuel efficiency for the vehicle, and clearing a portion of the rearward surface of the rear-facing portion at the same time, for example. The horizontal air stream passing over the vehicle can be projected between inner and outer air foil elements, and focused along the rear-facing portion, and this may lead to increasing fuel efficiency of the vehicle to a surprising extent as demonstrated from the data in Table 1 below.

TABLE 1

| DATE | 1301 | 1401 | 1801 | 1802 | 1901 | 2101 | 2402 | 2403 | 2404 | 2405 | 2406 | 2407 | 2601 | 2602 | 2801 |
|---|---|---|---|---|---|---|---|---|---|---|---|---|---|---|---|
| 15 Mar. 2012 | | | | | | | | | | | | | | | |
| 31 Mar. 2012 | | 6.73 | | | 11.4 | 10.6 | 8.87 | 8.37 | | 7.04 | | 4.86 | 7.63 | 10.1 | 6.61 |
| 19 Apr. 2012 | | 10.1 | | | 9.91 | 12.3 | | 7.61 | 8.26 | 7.83 | 8.13 | 8.77 | 7.36 | 9.07 | 6.87 |
| 30 Apr. 2012 | 11.42 | 11.66 | | | 11.13 | 7.91 | 7.53 | 9.46 | 8.16 | 8.53 | 7.34 | 9.47 | 10.2 | 6.73 |
| 15 May 2012 | | 10.44 | | | 11.57 | 8.84 | 7.51 | 7.69 | 7.79 | | 7.13 | 9.46 | 9.02 | 6.24 |
| 31 May 2012 | 13.18 | 10.9 | | | 11.36 | 8.39 | | 7.54 | 7.16 | 4.95 | 7.56 | | 13 | 6.54 |
| 15 Jun. 2012 | 14.45 | 10.42 | | | 5.3 | 11.53 | 8.46 | 5.43 | 0.77 | 8.98 | 5.25 | 7.53 | 8.57 | 7.62 | 6.39 |
| 30 Jun. 2012 | 11.63 | 11.9 | | | 9.35 | 11.7 | 7.5 | 8.09 | 14.6 | 7.13 | 7.44 | 7.63 | 9.48 | 9.82 | 7.35 |
| 15 Jul. 2012 | | 10.38 | | | 11.1 | 11.16 | 8.24 | 8.39 | | 7.5 | 7.54 | 7.37 | 8.52 | 9.28 | 6.42 |
| 31 Jul. 2012 | | 10.34 | | 6.8 | 10.7 | 10.19 | 9.19 | 7.11 | 7.43 | 3.21 | 10 | 8.15 | 9.92 | 9.93 | 6.9 |
| 15 Aug. 2012 | | | | | | | | | | | | | | | |

| 2802 | 2901 | 3101 | 3103 | 3104 | 3105 | 3201 | 3202 | 3203 | 3204 | 3302 |
|---|---|---|---|---|---|---|---|---|---|---|
| | | | | W/Foil | | W/Foil | | | | |
| | | 3.57 | | 6.36 | | 8.34 | | | 6.36 | |
| 9.96 | | 7.66 | | 7.78 | | 6.96 | 7.75 | 6.6 | 6.41 | |
| 7.07 | | 5.99 | | 7.6 | 9.2 | 7.99 | 6.81 | 7.23 | 5.29 | 6.57 |
| 6.64 | | 6.99 | | 8.04 | 8.81 | 8.04 | 7.63 | 6.95 | 5.1 | 8.32 |
| 6.02 | 9.8 | 6.13 | | 6.72 | 8.68 | 8.37 | 8.28 | 6.12 | 6.14 | 8.92 |
| 6.1 | 8.26 | 5.83 | 4.95 | 6.39 | | 7.79 | 6.29 | 6.79 | 6.31 | 8.34 |
| | | | Gillig Phantom 29' Bus | | | | Gillig Low-Floor 35' Bus | | | |
| | | 6.03 | 4.95 | | | | 7.35 | 6.74 | 5.95 | |
| | | | | W/O Foil | | W/O Foil | | | | |
| 6.45 | 6.02 | 7.2 | 6.34 | 6.06 | | 6.11 | 6.27 | 7.33 | 7.09 | 8.84 |
| 5.87 | | 6.48 | 6.86 | 6.8 | 8.12 | 7.84 | 6.53 | 6.65 | 5.1 | |
| 7.06 | | 6.35 | 5.17 | 6.7 | 7.84 | 5.86 | 8.84 | 7.53 | 7.2 | |
| 6.69 | 4.69 | | 5.33 | 6.8 | 8.06 | 6.86 | 7.04 | 7.94 | 6.59 | |
| | | | Gillig Phantom 29' Bus | | | | Gillig Low-Floor 35' Bus | | | |
| | | 6.68 | 5.93 | | | | 7.17 | 7.36 | 6.5 | |
| | | | Variance | 0.56 | | 1.25 | | | | |

| Cost of Air Foil | $1,000.00 | Cost of Air Foil | $1,000.00 |
|---|---|---|---|
| Annual Miles = | 50,000 | Annual Miles = | 50,000 |
| Original Operational Cost | | Original Operational Cost | |
| MPG without air foil MPG | 6.59 | MPG without air foil MPG | 6.67 |
| Annual Miles divided by MPG without Air Foil | $7,587.25 | Annual Miles divided by MPG without Air Foil | $7,499.06 |
| Cost per gallon of Fuel | $3.28 | Cost per gallon of fuel | $3.28 |
| Annual Fuel Cost | $24,886.19 | Annual Fuel Cost | $24,596.93 |
| New Operational Cost | | New Operational Cost | |
| MPG with air foil | 7.15 | MPG with air foil | 7.92 |
| Annual Miles divided by MPG with Air Foil | $6,994.64 | Annual Miles divided by MPG with Air Foil | $6,317.12 |
| Cost per gallon of fuel | $3.28 | Cost per gallon of fuel | $3.28 |
| Annual Fuel Cost | $22,942.41 | Annual Fuel Cost | $20,720.15 |

TABLE 1-continued

| | | | |
|---|---|---|---|
| Variance of Costs | $1,943.78 | Variance of Costs | $3,876.77 |
| Variance Divided by 12 | $161.98 | Variance Divided by 12 | $323.06 |
| Pay-off Rate in Months | 6.2 | Pay-off Rate in Months | 3.1 |

Note:
Changing any of these hard numbers will change the outcome
MPG = Miles per Gallon
Adjustable Numbers are:
Cost of Air Foil
Annual Miles
Cost per gallon of Fuel
MPG without air foil MPG
MPG with air foil In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. An air foil system for attachment to an upper rear edge of a rear-facing portion of a vehicle to project into a horizontal airstream passing over a roof of the portion as the vehicle is propelled over a roadway to deflect and direct two layers of the airstream over the upper rear edge and downward along the rear-facing portion to provide two moving air curtains over the rear-facing portion, comprising:
   a complimentary pair of inner and outer air foil elements aligned along the upper rear edge and configured to receive airstream from a front portion of the vehicle, the inner air foil element extending between an entrance edge and an exit edge, the elongated outer air foil element complementary to and extending between the entrance edge and the exit edge with the entrance edge of the outer air foil element being displaced above the entrance edge of the inner air foil element and the exit edge of the outer air foil element being displaced rearward of the exit edge of the inner air foil element;
   the complimentary inner and outer air foil elements forming an opening in one cross section between entrance edges and an exit between exit edges, the opening being from 2 and 6 inches in height in the one cross section and the exit being from between about ¾ and 4 inches in height in the one cross section; and
   a mounting assembly operatively connected to the inner and outer air foil elements for attaching the air foil elements to the rear-facing portion of the vehicle.

2. The system of claim 1 wherein the opening is from about between 3 and 6 inches in height in the one cross section and the exit is from about between about 2 and 4 inches in height in the one cross section.

3. The system of claim 1 wherein the opening is from about between 2 and 3 inches in height in the one cross section and the exit is from about between about ¾ and 2 inches in height in the one cross section.

4. An air foil system for attachment to an upper rear edge of a rear-facing portion of a vehicle to project into a horizontal airstream passing over a roof of the portion as the vehicle is propelled over a roadway to deflect and direct two layers of the airstream over the upper rear edge and downward along the rear-facing portion to provide two moving air curtains over the rear-facing portion, comprising:
   a complimentary pair of inner and outer air foil elements aligned along the upper rear edge and configured to receive airstream from a front portion of the vehicle, the inner air foil element extending between an entrance edge and an exit edge, the elongated outer air foil element complementary to and extending between the entrance edge and the exit edge with the entrance edge of the outer air foil element being displaced above the entrance edge of the inner air foil element and the exit edge of the outer air foil element being displaced rearward of the exit edge of the inner air foil element;
   the complimentary inner and outer air foil elements forming a compression chamber between the complimentary entrance and exit edges, the compression chamber having a height in one cross section that is from ½ inch to about 3 inches; and
   a mounting assembly operatively connected to the inner and outer air foil elements for attaching the air foil elements to the rear-facing portion of the vehicle.

5. The system of claim 4 wherein the compression chamber has a height in one cross section that is from about 1½ inch to about 3 inches.

6. The system of claim 4 wherein the compression chamber has a height in one cross section that is from about ½ inch to about 1½ inches.

7. An air foil system for attachment to an upper rear edge of a rear-facing portion of a vehicle to project into a horizontal airstream passing over a roof of the portion as the vehicle is propelled over a roadway to deflect and direct two layers of the airstream over the upper rear edge and downward along the rear-facing portion to provide two moving air curtains over the rear-facing portion, comprising:
   a complimentary pair of inner and outer air foil elements aligned along the upper rear edge and configured to receive airstream from a front portion of the vehicle, the inner air foil element extending between an entrance edge and an exit edge, the elongated outer air foil element complementary to and extending between the entrance edge and the exit edge with the entrance edge of the outer air foil element being displaced above the entrance edge of the inner air foil element and the exit edge of the outer air foil element being displaced rearward of the exit edge of the inner air foil element;
   the complimentary inner and outer air foil elements extend along the edge a distance of from about 10 inches to about 96 inches; and
   a mounting assembly operatively connected to the inner and outer air foil elements for attaching the air foil elements to the rear-facing portion of the vehicle.

8. The system of claim 7 wherein the complimentary inner and outer air foil elements extend along the edge a distance of from about 10 inches to about 60 inches.

9. The system of claim 7 wherein the complimentary inner and outer air foil elements extend along the edge a distance of from about 10 inches to about 80 inches.

10. The system of claim 7 wherein the complimentary inner and outer air foil elements extend along the edge a distance of from about 60 inches to about 80 inches.

11. The system of claim 7 wherein the complimentary inner and outer air foil elements extend along the edge a distance of from about 60 inches to about 90 inches.

12. The system of claim 7 wherein the complimentary inner and outer air foil elements extend along the edge a distance of at least a third of the maximum distance of the edge.

13. An air foil system for attachment to an upper rear edge of a rear-facing portion of a vehicle to project into a horizontal airstream passing over a roof of the portion as the vehicle is propelled over a roadway to deflect and direct two layers of the airstream over the upper rear edge and downward along the rear-facing portion to provide two moving air curtains over the rear-facing portion, comprising;

a complimentary pair of inner and outer air foil elements aligned along the upper rear edge and configured to receive airstream from a front portion of the vehicle, the inner air foil element extending between an entrance edge and an exit edge, the elongated outer air foil element complementary to and extending between the entrance edge and the exit edge with the entrance edge of the outer air foil element being displaced above the entrance edge of the inner air foil element and the exit edge of the outer air foil element being displaced rearward of the exit edge of the inner air foil element;

the complimentary inner and outer air foil elements forming an opening in one cross section between entrance edges and an exit between exit edges; and a mounting assembly operatively connected to the inner and outer air foil elements for aligning the opening within 5 inches of the rearmost portion of rear-facing portion and mounting the air foil elements to the rear-facing portion of the vehicle.

14. The system of claim 13 wherein the mounting assembly operatively connects the outer or inner foil element entrance edge to within 8 inches above the roof surface.

15. The system of claim 13 wherein the mounting assembly operatively connects the outer foil element entrance edge to within 6 to 8 inches above the roof surface.

16. The system of claim 13 wherein the mounting assembly operatively connects the inner foil element entrance edge to within 5 to 8 inches above the roof surface.

17. The system of claim 13 wherein the mounting assembly operatively connects the foil elements to direct airstream from the exit to greater than $3/4$ inches below the rear edge along the square-back portion.

18. A method for reducing the co-efficiency of drag and clearing of a rear-facing portion of a vehicle, the method comprising:

projecting a horizontal airstream passing over a roof of the portion as the vehicle is propelled over a roadway to provide two moving air curtains over the rear-facing portion;

reducing the co-efficiency of drag of the portion; and clearing a portion of the rearward surface of the rear-facing portion.

19. The method of claim 18 wherein a portion of the horizontal airstream is projected between inner and outer foil elements and focused along the square-back portion.

20. The method of claim 18 further comprising increasing the full efficiency of the vehicle.

* * * * *